US008533722B2

(12) United States Patent
Bansal et al.

(10) Patent No.: US 8,533,722 B2
(45) Date of Patent: *Sep. 10, 2013

(54) METHOD AND APPARATUS FOR ASSIGNING FRACTIONAL PROCESSING NODES TO WORK IN A STREAM-ORIENTED COMPUTER SYSTEM

(75) Inventors: Nikhil Bansal, Yorktown Heights, NY (US); James R. H. Challenger, Garrison, NY (US); Lisa Karen Fleischer, Ossining, NY (US); Kirsten Weale Hildrum, Hawthorne, NY (US); Richard P. King, Scarsdale, NY (US); Deepak Rajan, Fishkill, NY (US); David Tao, Glen Burnie, MD (US); Joel Leonard Wolf, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 1499 days.

This patent is subject to a terminal disclaimer.

(21) Appl. No.: 12/132,031

(22) Filed: Jun. 3, 2008

(65) Prior Publication Data
US 2008/0271036 A1 Oct. 30, 2008

Related U.S. Application Data

(63) Continuation of application No. 11/374,643, filed on Mar. 13, 2006, now Pat. No. 7,853,949.

(51) Int. Cl.
*G06F 9/46* (2006.01)
*G06F 1/00* (2006.01)
(52) U.S. Cl.
USPC .......................................... 718/104; 713/330

(58) Field of Classification Search
USPC ................. 718/102, 104; 713/300, 310, 320, 713/330, 340
See application file for complete search history.

(56) References Cited

U.S. PATENT DOCUMENTS

| 5,742,821 | A | * | 4/1998 | Prasanna ....................... 718/102 |
|---|---|---|---|---|
| 6,463,457 | B1 | * | 10/2002 | Armentrout et al. .......... 709/201 |
| 6,820,217 | B2 | * | 11/2004 | Mock et al. ...................... 714/15 |
| 6,907,261 | B2 | * | 6/2005 | Mandyam et al. ............. 455/522 |
| 6,957,435 | B2 | * | 10/2005 | Armstrong et al. ........... 718/104 |
| 7,007,183 | B2 | * | 2/2006 | Rawson, III ................... 713/324 |
| 7,290,125 | B2 | * | 10/2007 | Armstrong et al. ............... 713/1 |
| 7,779,412 | B2 | * | 8/2010 | Lin et al. ........................ 718/102 |
| 2003/0195938 | A1 | * | 10/2003 | Howard et al. ................ 709/208 |
| 2003/0217090 | A1 | * | 11/2003 | Chauvel et al. ............... 709/102 |
| 2004/0111596 | A1 | * | 6/2004 | Rawson, III ...................... 713/1 |
| 2006/0080076 | A1 | * | 4/2006 | Lahiri et al. .................... 703/18 |
| 2006/0136761 | A1 | * | 6/2006 | Frasier et al. ................. 713/320 |
| 2007/0211280 | A1 | | 9/2007 | Bansal et al. |
| 2010/0242042 | A1 | | 9/2010 | Bansal et al. |

OTHER PUBLICATIONS

T. Ibaraki et al., : Resource Allocation Problems, Algorithmic Approaches, The MIT Press, London, England; 1988 (2 pages).

(Continued)

*Primary Examiner* — Van Nguyen
(74) *Attorney, Agent, or Firm* — Tutunjian & Bitetto, P.C.; William J. Stock

(57) ABSTRACT

An apparatus and method for making fractional assignments of processing elements to processing nodes for stream-based applications in a distributed computer system includes determining an amount of processing power to give to each processing element. Based on a list of acceptable processing nodes, a determination of fractions of which processing nodes will work on each processing element is made. To update allocations of the amount of processing power and the fractions, the process is repeated.

18 Claims, 12 Drawing Sheets

(56) References Cited

OTHER PUBLICATIONS

D. Bertsimas et al., "Introduction to Linear Optimization", Athena Scientific, Belmont, MA; 1997 (2 pages).

Cormen et al., "Introduction to ALgorithms", The MIT Press; Cambridge, MA; sixth printing, 1992. (2 pages).

Ravindra K. Ahuja et al., "Network Flows, Theory, Algorithms, and Applications", Prentice Hall, Englewood Cliffs, NJ; 1993. (2 pages).

\* cited by examiner

METHOD AND APPARATUS FOR ASSIGNING FRACTIONAL PROCESSING NODES TO WORK IN A STREAM-ORIENTED COMPUTER SYSTEM

RELATED APPLICATION INFORMATION

This application is a Continuation application of U.S. patent application Ser. No. 11/374,643 U.S. Pat. No. 7,853,949 filed Mar. 13, 2006, incorporated herein by reference in its entirety.

GOVERNMENT RIGHTS

This invention was made with Government support under Contract No.; TIA H98230-04-3-0001 awarded by the U.S. Department of Defense. The Government has certain rights in this invention.

BACKGROUND

1. Technical Field

The present invention relates generally to scheduling work in a stream-based distributed computer system, and more particularly, to systems and methods for deciding how to fractionally assign processing elements to processing nodes, based on a list of candidate processing nodes for each processing element.

2. Description of the Related Art

Distributed computer systems designed specifically to handle very large-scale stream processing jobs are in their infancy. Several early examples augment relational databases with streaming operations. Distributed stream processing systems are likely to become very common in the relatively near future, and are expected to be employed in highly scalable distributed computer systems to handle complex jobs involving enormous quantities of streaming data.

In particular, systems including tens of thousands of processing nodes able to concurrently support hundreds of thousands of incoming and derived streams may be employed. These systems may have storage subsystems with a capacity of multiple petabytes.

Even at these sizes, streaming systems are expected to be essentially swamped at almost all times. Processors will be nearly fully utilized, and the offered load (in terms of jobs) will far exceed the prodigious processing power capabilities of the systems, and the storage subsystems will be virtually full. Such goals make the design of future systems enormously challenging.

Focusing on the scheduling of work in such a streaming system, it is clear that an effective optimization method is needed to use the system properly. Consider the complexity of the scheduling problem as follows.

Referring to FIG. 1, a conceptual system is depicted for scheduling typical jobs. Each job 1-9 includes one or more alternative directed graphs 12 with nodes 14 and directed arcs 16. For example, job 8 has two alternative implementations, called templates. The nodes correspond to tasks (which may be called processing elements, or PEs), interconnected by directed arcs (streams). The streams may be either primal (incoming) or derived (produced by the PEs). The jobs themselves may be interconnected in complex ways by means of derived streams. For example, jobs 2, 3 and 8 are connected.

Referring to FIG. 2, a typical distributed computer system 11 is shown. Processing nodes 13 (or PNs) are interconnected by a network 19.

One problem includes the scheduling of work in a stream-oriented computer system in a manner which maximizes the overall importance of the work performed. The streams serve as a transport mechanism between the various processing elements doing the work in the system. These connections can be arbitrarily complex. The system is typically overloaded and can include many processing nodes. Importance of the various work items can change frequently and dramatically. Processing elements may perform continual and other, more traditional work as well. There are no known solutions to this problem.

SUMMARY

A scheduler needs to perform each of the following functions: (1) decide which jobs to perform in a system; (2) decide, for each such performed job, which template to select; (3) fractionally assign the PEs in those jobs to the PNs. In other words, it should overlay the PEs of the performed jobs onto the PNs of the computer system, and should overlay the streams of those jobs onto the network of the computer system; and (4) attempt to maximize a measure of the utility of the streams produced by those jobs.

The following practical issues make it difficult for a scheduler to provide this functionality effectively.

First, the offered load may typically exceed the system capacity by large amounts. Thus all system components, including the PNs, should be made to run at nearly full capacity nearly all the time. A lack of spare capacity means that there is no room for error.

Second, stream-based jobs have a real-time time scale. Only one shot is available at most primal streams, so it is crucial to make the correct decision on which jobs to run. There are multiple step jobs where numerous PEs are interconnected in complex, changeable configurations via bursty streams, just as multiple jobs are glued together. Flow imbalances, which are likely it scheduling is not done precisely, can lead to buffer overflows (and loss of data), or to underutilization of PEs.

Third, one needs the capability of dynamic rebalancing of resources for jobs, because the importance they produce changes frequently and dramatically. For example, discoveries, new and departing queries and the like can cause major shifts in resource allocation. These changes must be made quickly. Primal streams may come and go unpredictably.

Fourth, there will typically be lots of special and critical requirements on the scheduler of such a system, for instance, priority, resource matching, licensing, security, privacy, uniformity, temporal, fixed point and incremental constraints.

Fifth, given a system running at near capacity, it is even more important than usual to optimize the proximity of the interconnected PE pairs as well as the distance between PEs and storage. Thus, for example, logically close PEs should be assigned to physically close PNs.

These competing difficulties make the finding of high quality schedules very daunting. There is presently no known prior art describing schedulers meeting these design objectives. It will be apparent to those skilled in the art that no simple heuristic scheduling method will work satisfactorily for stream-based computer systems of this kind. There are simply too many different aspects that need to be balanced against each other.

Accordingly, aspects of a three-level hierarchical method which creates high quality schedules in a distributed stream-based environment will be described. The hierarchy is temporal in nature. As the level in the hierarchy increases, the difficulty in solving the problem also increases. However, more time to solve the problem is provided as well. Furthermore, the solution to a higher level problem makes the next lower level problem more manageable. The three levels, from top to bottom, may be referred to for simplicity as the macro, micro and nano models respectively.

Three hierarchically organized methods, taken together, provide the full functionality described above. The present invention describes one of these three methods, and in particular is directed to the micro model. Based on a list of jobs that will be performed, a list of which template alternative will be chosen to execute that job, and a list of candidate processing nodes (PNs) for each of the processing elements (PEs) in those templates, all supplied by the macro model. The micro model makes fractional assignments of the PEs to the PNs in a manner which maximizes the importance of the work in the system, adapts to changes in that importance over time, and simultaneously meets constraints.

The present invention is an epoch-based method for making fractional assignments of processing elements to processing nodes in a distributed stream-oriented computer system. For each processing element the method is given a set of candidate processing nodes, a metric describing the importance of the streams, rules for what constitutes an acceptable fraction of each processing element on each processing node, a description of the current fractional assignments, a list of those fractional assignments which cannot be modified from their current values, and rules for the maximum amount of change permitted to these assignments. The time unit for the method is a micro epoch—on order of minutes. The output fractional allocations are flow balanced, at least on average at the temporal level of a micro epoch. These fractional assignments obey the described rules.

In one embodiment, an apparatus and method for making fractional assignments of processing elements to processing nodes for stream-based applications in a distributed computer system includes determining an amount of processing power to give to each processing element. Based on a list of acceptable processing nodes, a determination of what fractions of which processing nodes will work on each processing element is made. To update allocations of the amount of processing power and the fractions, the process is repeated.

A method of making fractional assignments of processing elements to processing nodes for stream-based applications in a distributed computer system includes determining an amount of processing power to give to each processing element by providing a quantity method to determine processing goals for each processing element for a next epoch and determining a list of candidate processing nodes to which each processing element can be assigned. Based on a list of acceptable processing nodes, fractions of which processing nodes which will work on each processing element are determined by providing a where method configured to minimize differences between goals output by the quantity method and achieved allocations of resources. These steps are repeated to update allocations of the amount of processing power and the fractions to increase overall importance of work in a system.

An apparatus for scheduling stream-based applications in a distributed computer system includes a scheduler configured to schedule work using a micro method configured to fractionally allocate processing elements to processing nodes in the system to react to changing importance of the work. The micro method includes a quantity component configured to maximize real importance by revising allocation goals to handle changes in weights of jobs, changes in jobs, and changes in node states, and a where component configured to minimize differences between goals output by the quantity component and achieved allocations. These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
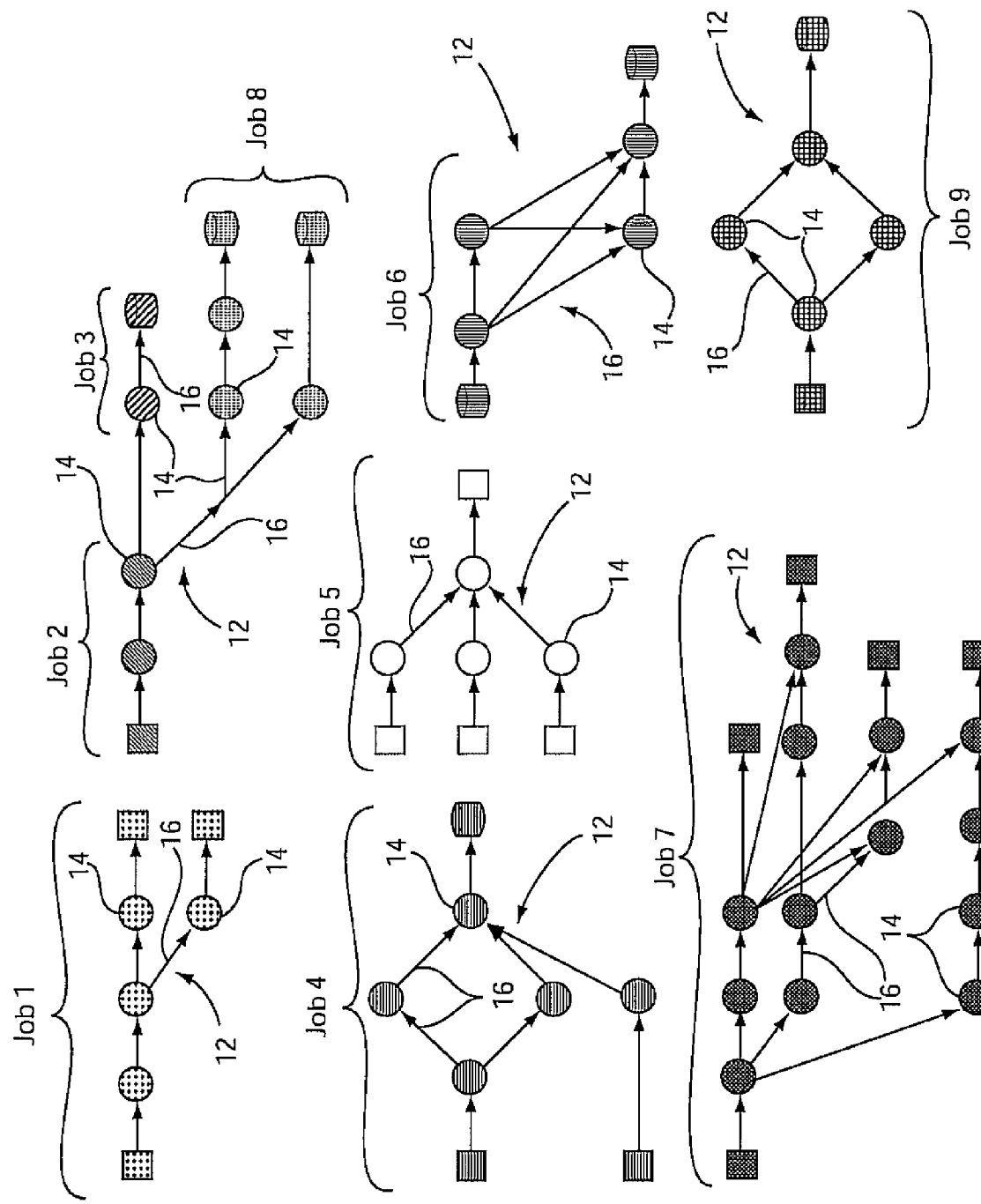
FIG. 1 depicts an example of a collection of jobs, including alternative templates, processing elements and streams.
Figure 2:
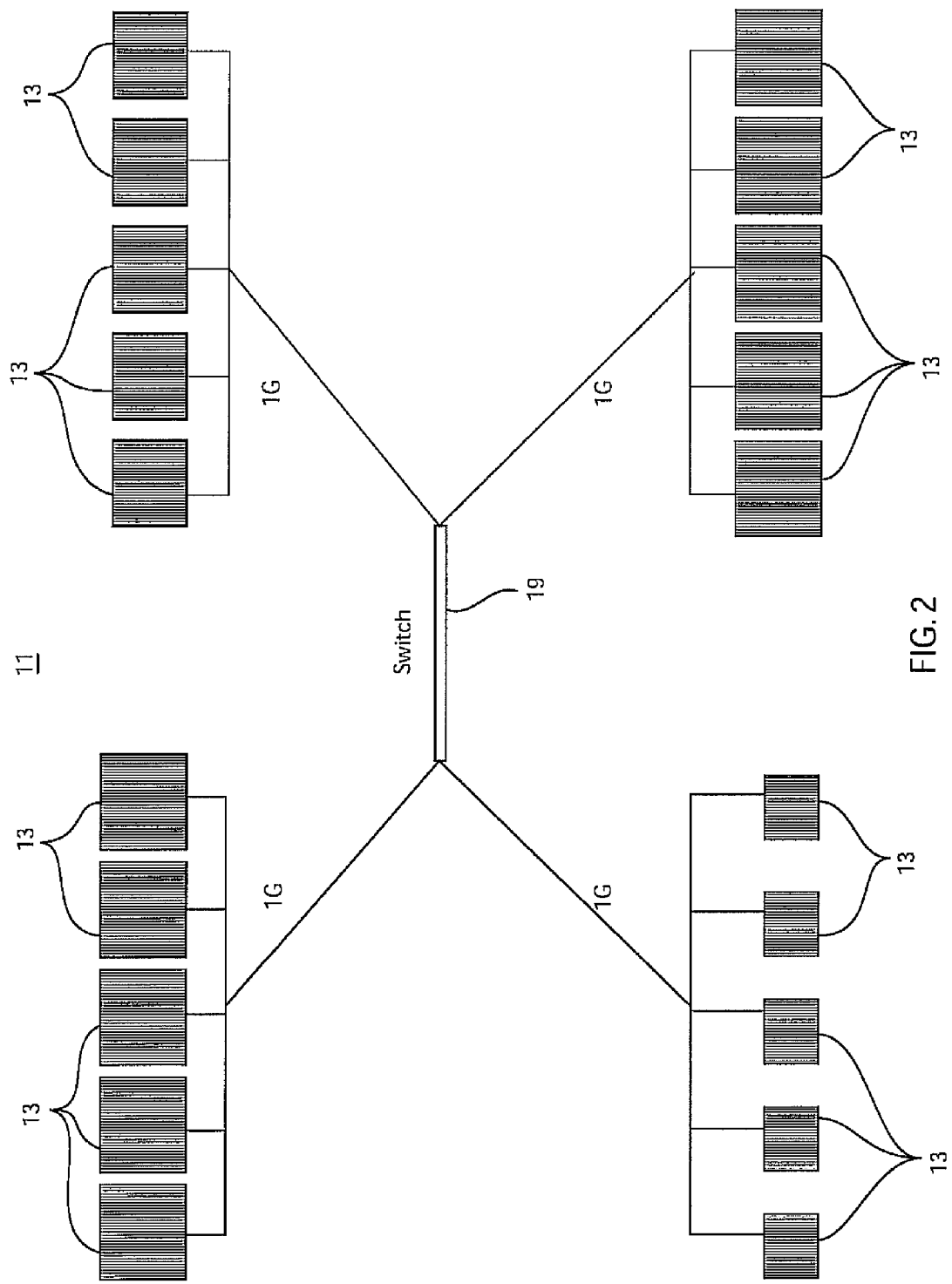
FIG. 2 depicts an example of processing nodes and a network of a distributed stream-based system including switches.

Embodiments of the present invention include an epoch-based system and method for making fractional assignments of processing elements to processing nodes in a distributed stream-oriented computer system. In one particularly useful embodiment, for each processing element, the method is given a set of candidate processing nodes, a metric describing the importance of the streams, rules for what constitutes an acceptable fraction of each processing element on each processing node, a description of the current fractional assignments, a list of those fractional assignments which cannot be modified from their current values, and rules for the maximum amount of change permitted to these assignments.

A hierarchical scheduler for distributed computer systems is particularly useful for stream-based applications. The scheduler attempts to maximize the importance of all work in the system, subject to a large number of constraints of varying importance. The scheduler includes two or more methods and distinct temporal levels.

In one embodiment, three major methods at three distinct temporal levels are employed. The distinct temporal levels may be referred to as macro, micro and nano models or levels, respectively.

The time unit for the macro model is a macro epoch, e.g., on order of a half hour or an hour. The output of the macro model may include a list of which jobs will run, a choice of one of potentially multiple alternative templates for running the job, and the lists of candidate processing nodes for each processing element that will run.

The nano model makes decisions every few seconds, e.g., about two orders of magnitude less than a micro epoch. One goal of the nano model is to implement flow balancing decisions of the micro model at a much finer temporal level, dealing with burstiness and the differences between expected and achieved progress. Such issues can lead to flooding of stream buffers and/or starvation of downstream processing elements.

Although the micro model works well in the hierarchical system, the micro model may be employed independently as well. A time scale or unit for the method is a micro epoch, which is for example on order of minutes. The output fractional allocations are preferably flow balanced, at least on average at the temporal level of a micro epoch. These fractional assignments obey described rules.

A commonly assigned disclosure, filed Mar. 13, 2006 as U.S. patent application Ser. No. 11/374,192, is hereby incorporated by reference. This disclosure described the scheduler in greater detail.

A commonly assigned disclosure, filed Mar. 13, 2006 and issued as U.S. Pat. No. 7,738,129 on Jun. 15, 2010, is hereby incorporated by reference. This disclosure describes the macro method in greater detail.

In one embodiment, a 'quantity' stage and a 'where' stage are provided for the micro model. The micro model works well when used in conjunction with a macro model and nano model in a hierarchically processed temporal system where scheduling work is performed through temporal epochs which are related to the processing resources needed to arrive at a solution. The output of the micro model includes flow balanced fractional allocations of processing elements (PEs) to processing nodes (PNs).

The micro model handles dynamic variability in relative importance of work (via revised "weights"), changes in the state of the system, changes in job lists, changes in job stages, without having to consider the difficult constraints handled in the macro model.

The present disclosure employs a number of new concepts, which are now illustratively introduced.

Value Function Each derived stream produced by a job will have a value function associated with the stream. This may include an arbitrary real-valued function whose domain is a cross product from a list of metrics such as rate, quality, input stream consumption, input stream age, completion time and so on. The resources assigned to the upstream processing elements (PEs) can be mapped to the domain of this value function via an iterative composition of so-called resource learning functions, one for each derived stream produced by such a PE.

Learning Function Each resource learning function maps the cross products of the value function domains of each derived stream consumed by the PE with the resource given to that PE into the value function domain of the produced stream.

A value function of 0 is completely acceptable. In particular, it is expected that a majority of intermediate streams will have value functions of 0. Most of the value of the system will generally be placed on the final streams. Nevertheless, the present invention is designed to be completely general with regard to value functions.

Weight: Each derived stream produced by a job will have a weight associated with the stream. This weight may be the sum and product of multiple weight terms. One summand may arise from the job which produces the stream and others may arise from the jobs which consume the stream if the jobs are performed.

Static and Dynamic Terms: Each summand may be the product of a "static" term and a "dynamic" term. The "static" term may change only at weight epochs (on the order of months), while the "dynamic" term may change quite frequently in response to discoveries in the running of the computer system. Weights of 0 are perfectly acceptable and changing weights from any number to 0 facilitate the turning on and off of subjobs. If the value function of a stream is 0, the weight of that stream can be assumed to be 0 as well.

Importance: Each derived stream produced by a job has an importance which is the weighted value. The summation of this importance over all derived streams is the overall importance being produced by the computer system, and this is one quantity that present embodiments attempt to optimize.

Priority Number Each job in the computer system has a priority number which is effectively used to determine whether the job should be run at some positive level of resource consumption. The importance, on the other hand, determines the amount of resources to be allocated to each job that will be run.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
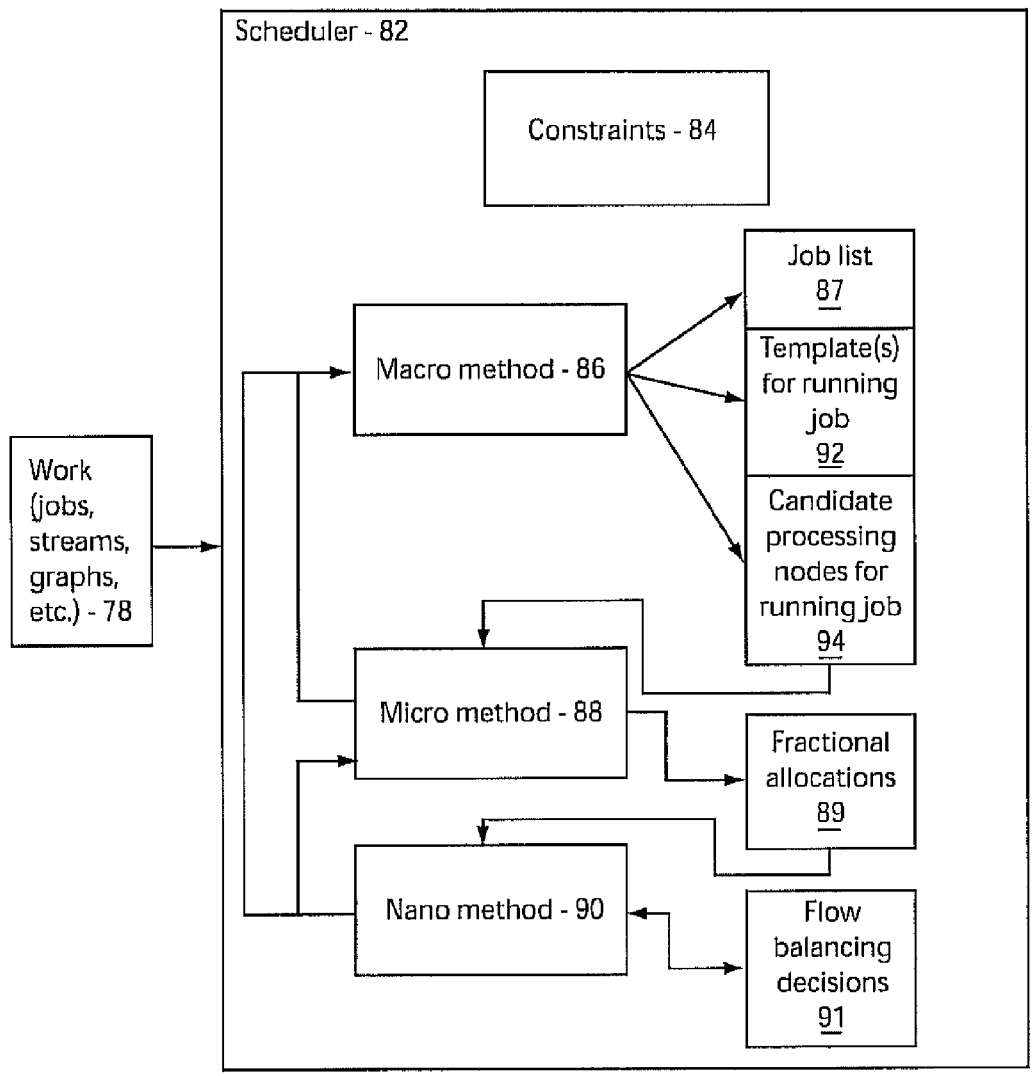
FIG. 3 is a block/flow diagram illustratively showing a scheduler in accordance with one embodiment.

Referring now to the drawings in which like numerals represent the same or similar elements and initially to FIG. 3, a block/flow diagram shows an illustrative system 80. System 80 includes a hierarchically designed scheduler 82 for distributed computer systems designed for stream-based applications. The scheduler 82 attempts to maximize the importance of all work in the system, subject to a large number of constraints 84. The scheduler includes three major methods at three distinct temporal levels. These are known as the macro 86, micro 88 and nano 90 models, respectively.

The scheduler 82 receives templates, data, graphs, streams or any other schema representing jobs/applications to be performed by system 80. The scheduler 82 employs the constraints and the hierarchical methods to provide a solution the scheduling problems presented using the three temporal regimes as explained hereinafter.

Beginning with the macro method/model 86, constraints 84 or other criteria are employed to permit the best scheduling of tasks. The macro method 86 performs the most difficult scheduling tasks. The output of the macro model 86 is a list 87 of which jobs will run, a choice of one of potentially multiple alternative templates 92 for running the job, and the lists of candidate processing nodes 94 for each processing element that will run. The output of the micro model 88 includes fractional allocations 89 of processing elements to processing nodes based on the decisions of the macro model 86.

The nano model 90 implements flow balancing decisions 91 of the micro model 88 at a much finer temporal level, dealing with burstiness and the differences between expected and achieved progress.

At a highest temporal level (macro), the jobs that will run, the best template alternative for those jobs that will run, and candidate processing nodes for the processing elements of the best template for each running job are selected to maximize the importance of the work performed by the system. At a medium temporal level (micro) fractional allocations and reallocations of processing elements are made to processing nodes in the system to react to changing importance of the work.

At a lowest temporal level (nano), the fractional allocations are revised on a nearly continual basis to react to the burstiness of the work, and to differences between projected and real progress. The steps are repeated through the process. The ability to manage the utilization of time at the highest and medium temporal level, and the ability to handle new and updated scheduler input data in a timely manner are provided.

Figure 4:
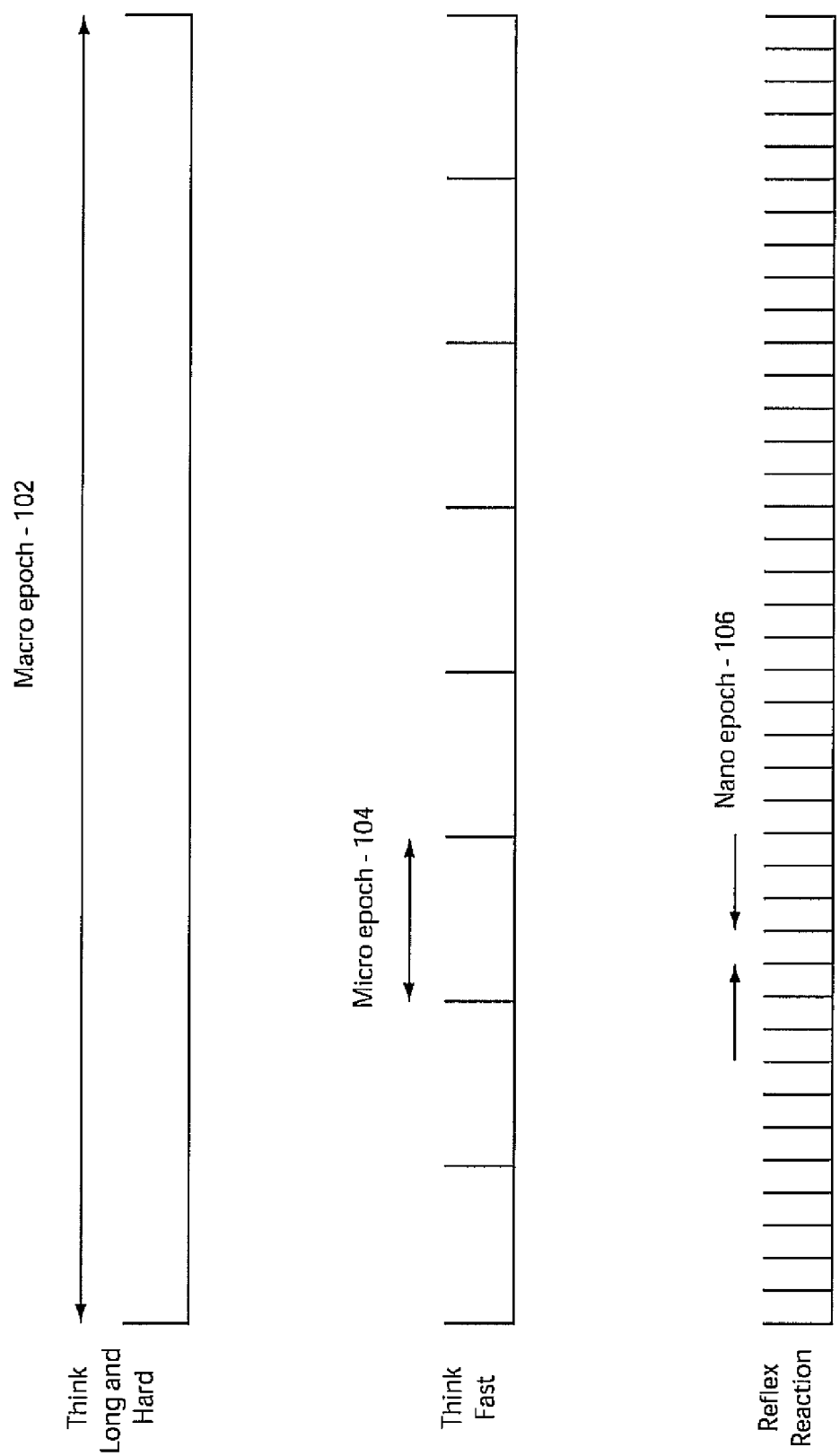
FIG. 4 depicts three distinct temporal levels of the three epoch-based models referred to as macro, micro and nano epochs.

Referring to FIG. 4, three distinct time epochs, and the relationships between three distinct models are illustratively shown. The time epochs includes a macro epoch 102, a micro epoch 104 and a nano epoch 106. Note that each macro epoch 102 is composed of multiple micro epochs 104, and that each micro epoch 104 is composed of multiple nano epochs 106. The macro method 86 (FIG. 3) has sufficient time to "think long and hard". The micro model 88 (FIG. 3) only has time to "think fast". The nano model 90 (FIG. 3) effectively involves "reflex reactions". The scheduling problem is decomposed into these levels (102, 104, 106) because different aspects of the problem need different amounts of think times. Present embodiments more effectively employ resources by solving the scheduling problem with an appropriate amount of resources.

Figure 5:
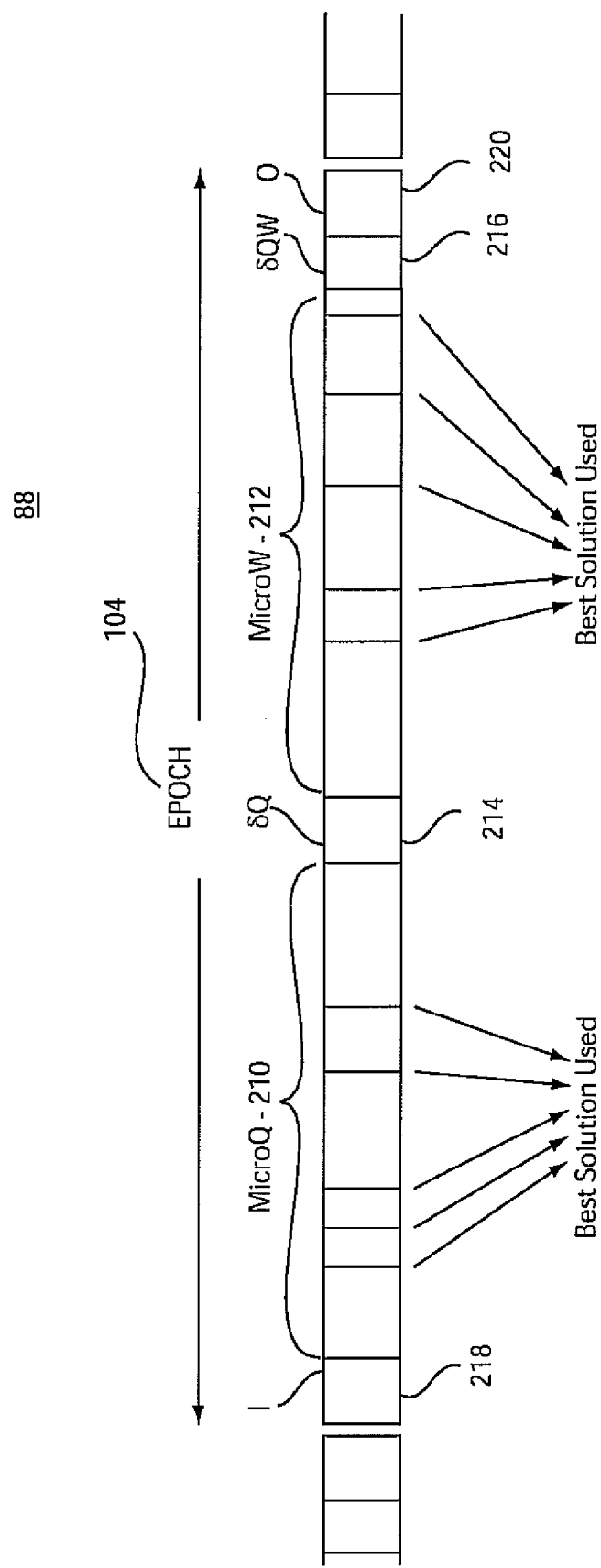
FIG. 5 depicts the decomposition of the micro epoch into its six component times, including times for an input module, a microQ module, an optional $\delta Q$ module, a microW module, an optional $\delta QW$ module and an output implementation module.

Referring to FIG. 5, a micro model 86 has two major methods, which are preferably executed sequentially. These are referred to as MicroQuantity (microQ) and MicroWhere (microW) modules, 210 and 212, respectively. These two modules 210 and 212 can be described as follows.

MicroQ 210 is the 'quantity' component of the micro model 88. MicroQ 210 maximizes real importance by revising the allocation goals to handle changes in weights, changes in jobs, and changes in node states. Embodiments of the present invention employ a combination of the network flow and linear programming (LP) techniques.

MicroW 212 is the 'where' component of the micro model 104. MicroW 212 minimizes the differences between the goals output by the microQ module 210 and the achieved allocations, subject to incremental, provisioning, and node state constraints. Embodiments of the present invention may employ network flow inspired and other heuristic techniques.

The micro model handles dynamic variability in the relative importance of work (e.g., via revised "weights"), changes in the state of the system, changes in the job lists, changes in the job stages, without having to consider the difficult constraints handled in the macro model. The micro model exhibits the right balance between problem design and difficulty, as a result of the output from macro model. The micro model is flexible enough to deal with dynamic variability in importance and other changes, also due to the "heavy lifting" in the macro model.

The manner in which the micro model is decoupled is illustratively demonstrated. There are two sequential methods 210 and 212, plus an input module (I) 21B and an output implementation module (O) 220. There are also two optional 'δ' models, δQ 214 and δQW 216, which permit for updates and/or corrections in the input data for the two sequential methods 210 and 212, by revising the output of these two methods incrementally to accommodate changes that may have occurred. The present embodiment describes the two decoupled sequential methods below.

MicroQ 210 maximizes real importance by revising the allocation goals to handle changes in weights, changes in jobs, and changes in node states. Aspects of the present invention employ a combination of the network flow and linear programming (LP) techniques.

MicroW 212 minimizes the differences between the goals output by the microQ module and the achieved allocations, subject to incremental, provisioning, and node state constraints. Aspects of the present invention employ network flow inspired and other heuristic techniques.

The role of the micro Q module 210 is to determine the processing goals for each PE for the next micro epoch. The micro quantity problem takes input from the macro model. This includes the set of candidate PNs to which each PE can be assigned. As part of the input, the PEs are grouped into components, and the desired allocation of processing power to a PE is connected to the overall level of allocation of processing power to the component that includes the level of allocation of processing power. This connection is described via pacing constraints that specify, for each level of allocation of processing power to the component, the proportion of the processing power that should be allocated to each PE.

For each component, there is a piecewise-linear and concave function mapping processing power assigned to the component to importance. The goal is to assign processing power to components to maximize total importance, satisfying the component PE pacing constraints. The following is an illustrative formulation of the microQ module 210.

Input Data: The quantity phase of an illustrative embodiment of the present invention will be best understood by employing the following notation:

P is the number of PEs, indexed by p.

N is the number of PNs, indexed by n.

$H_n$ is the processing power, in million instructions per second (mips) of node n.

$A_{pn}$ is 1 if node n is a candidate node for PE p; 0 otherwise.

C is the set of weakly connected components, indexed by c.

$S_c$ is the set of PEs in component c.

$I_c$ is the piecewise linear concave aggregate importance function for component c. It is a function of the amount of potential processing power $g_c$, in mips, assigned to the component. This may be the output of a macro quantity module in the macro model as described above or of a previous microQ if component c is unchanged. Otherwise, it is obtained via a preprocessing step.

$\rho_c$ is the number of linear segments in $I_c$.

$\alpha_{rc}$ is the right endpoint (on the processing power axis) for the $r^{th}$ line segment of $I_c$.

$R^c$ is the matrix that describes the pacing constraints for component c. Rows are indexed by PEs in c; columns are indexed by linear segments of $I_c$. Each column includes the function that partitions the potential mips $g_c$ into the individual potential PE mips $g_p$ for p in C according to the interval of processing power corresponding to this segment of the value function.

Each entry for segment i is a linear function of the form $a_{pi}g_c+b_{pi}$ and that the entries in column i satisfy the following properties:

$$\sum_p (a_{pi}g_c + b_{pi}) = g_c$$

and $a_{pi}g_c+b_{pi} \geq 0$ value of $g_c$ in the range of the interval i of the value function.

Variables:

$g_p$: primary output variable. Processing power goal for PE p, in mips.

$g_c$: primary output variable. Processing power goal for component c, in mips.

$y_{rc} \in \{0,1\}, r=1, \ldots, \rho_c$: auxiliary variable. Is 1 if $g_c$ is in the interval of the $r^{th}$ line segment of $I_c$.

$f_{pn}$: secondary output variable. Suggested fraction of processing node n used by PE p.

Objective Function:

$$\text{Maximize} \sum_c I_c(g_c).$$

Constraints:

$$\sum_r y_{rc} \leq 1$$

for all c∈C.

$g_c \geq \alpha_{(r-1)c} y_{rc}$ for all c∈C, $1 \leq r \leq \rho_c$.

$$g_c - \alpha_{rc} \leq [\alpha_{\rho_c c} - \alpha_{rc}] \sum_{i=r+1}^{\rho_c} y_{ic}$$

for all c∈C, $1 \leq r \leq \rho_c$.

$g_c = y_{rc} R^c_{rp}(g_c)$ for all c∈C, p∈$S_c$, $1 \leq r \leq \rho_c$.

$\Sigma_{A_{np}=1} H_n f_{pn} = g_p$ for all p∈P.

$\Sigma_{A_{np}=1} f_{pn} \leq 1$ for all n∈N.

$y_{rc} \in \{0,1\}$ for all c∈C, $1 \leq r \leq \rho_c$.

Solution Approach: The above program is nonlinear. This is not solved directly. Instead, the following approach is taken by the invention.

Figure 6:
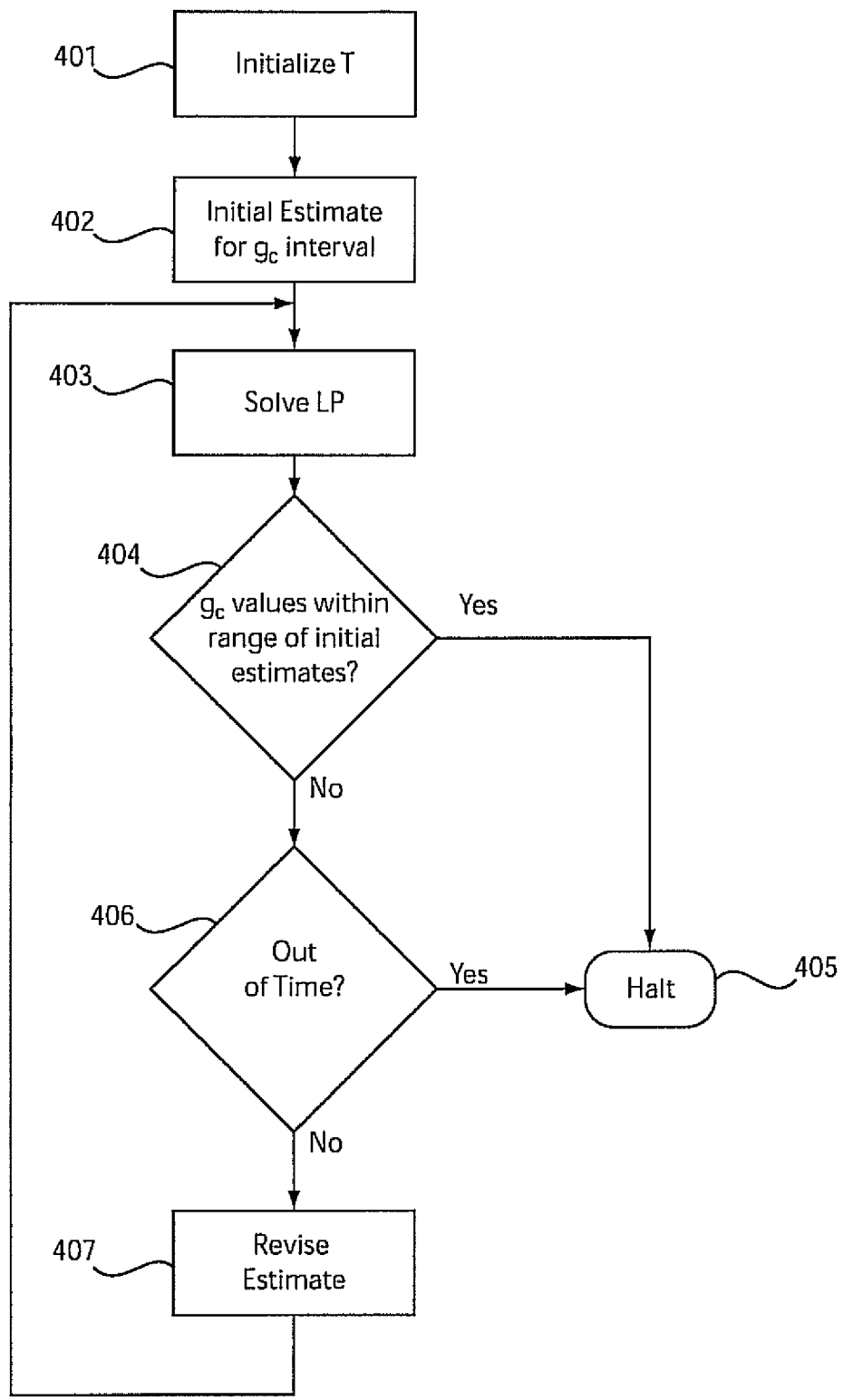
FIG. 6 is a block/flow diagram showing process steps for obtaining a solution for a microQ module in accordance with an illustrative embodiment.

Referring to FIG. 6, a block/flow diagram shows a basic solution method for the microQ model. A block 401 intializes time T. In block 402, an initial estimate is obtained for the interval in which $g_c$ lies. This determines a set of linear pacing constraints to enforce. Then, block 403 solves a linear program (LP) that is a network flow problem with these additional linear pacing constraints.

Block 404 tests the values of go. If the values of $g_c$ returned by this program lie in the same range as the initial estimate, then the microQ module halts at block 405. Otherwise, block 406 checks to see if the method is out of time. If it is, the module halts at block 405 with the best solution thus far. If not, block 407 modifies the initial estimate of the range, and the appropriate pacing constraints are imposed. Then, the method returns to block 403 to solve the LP again. The specific details of these steps are performed may involve another LP as will be described below.

The method of FIG. 6 can begin by performing a preprocessing step in case the input set of components or jobs has changed from the previous epoch.

Obtaining pacing parameters. For a new micro epoch, the first task of the micro quantity problem is to obtain new data for any new or modified component. In particular, the present invention needs the importance functions $I_c$ and corresponding matrix $R^c$ of pacing parameters for each new or changed component.

Step 1: For each aggregate amount of million instructions per second (mips) assigned to the component, determine the optimal partition of these mips among the PEs in the component and the associated value of this assignment. (These methods may already have been developed in a macroQ in the macro method described earlier, and they are invoked here.)

Step 2: Using the values and partitions obtained above, develop an (approximate) piecewise linear, concave value function (of mips) for the component, where each piece of the function corresponds to a linear function that partitions the input mips value among the PEs.

Obtaining Initial Pacing Constraints: To determine how to set the initial pacing constraints, the present invention finds an estimate of the right range of $g_c$ for each component. To do this, the module solves the problem of allocating processing power to components to maximize the importance, ignoring pacing constraints entirely. This yields initial estimates $\overline{g_c}$ of $g_c$. The value of $\overline{g_c}$ determines which set of pacing constraints to enforce for component c (namely, the set that should be enforced for this value of $g_c$).

Assuming the importance functions are piecewise linear and concave, the problem solved to find $\overline{g_c}$ is a network flow problem. If not, the problem can be made so by techniques which are standard to one skilled in the art.

Figure 7:
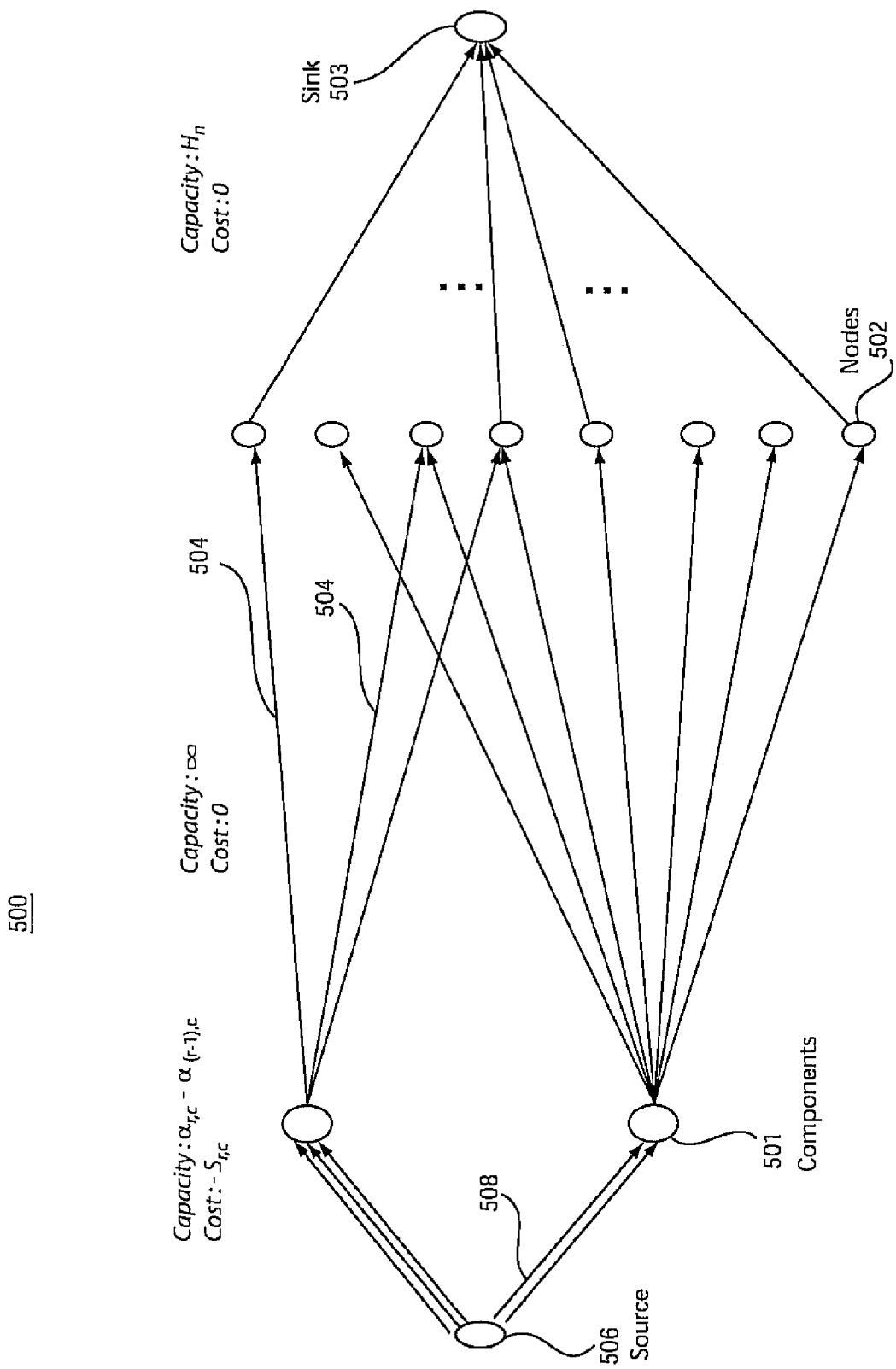
FIG. 7 depicts a microQ network showing arcs linking components and nodes between a source and sink for bit streams.
Figure 8:
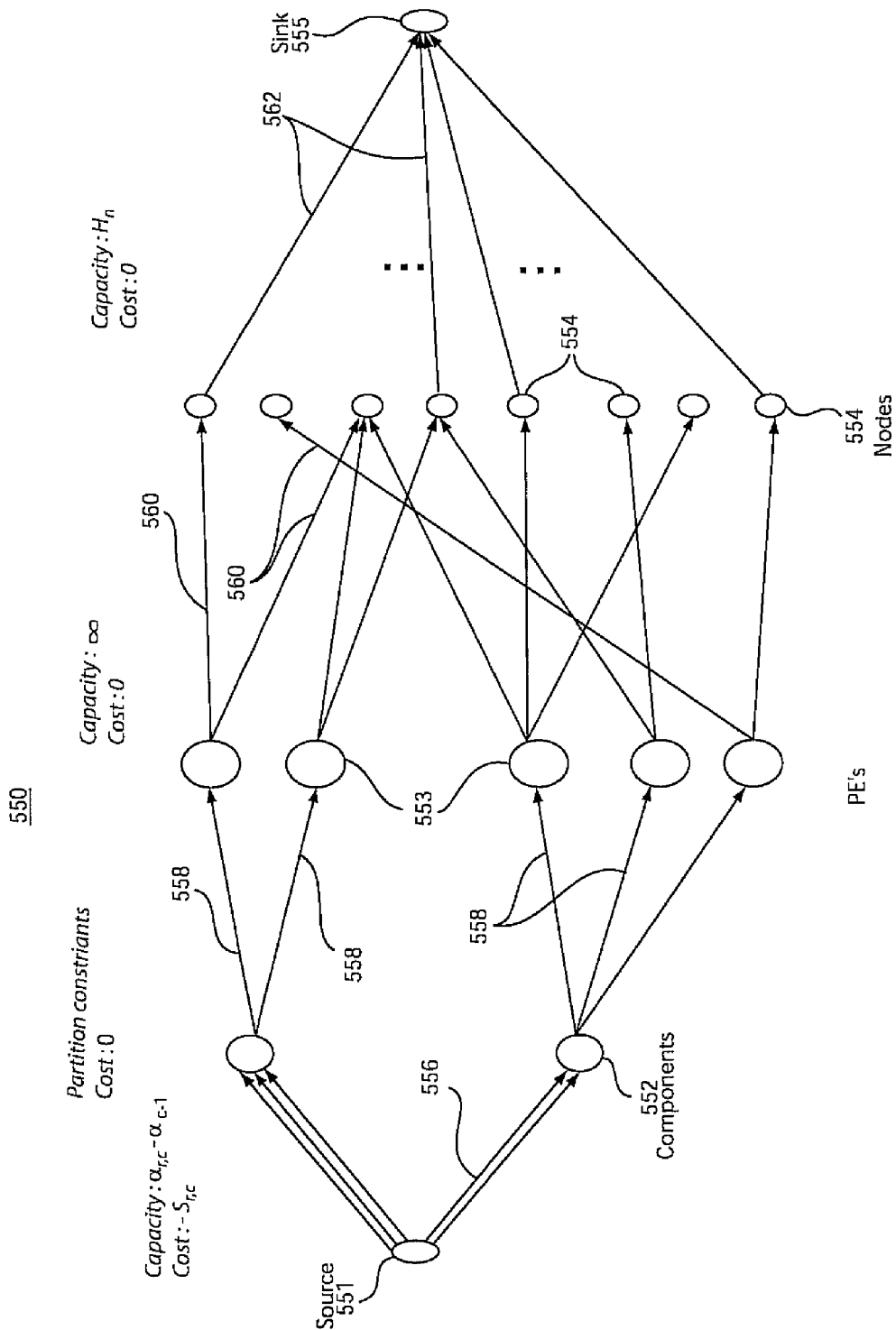
FIG. 8 depicts another microQ network showing arcs linking components, processing elements and processing nodes between source and a sink for bit streams.

Referring to FIGS. 7 and 8, two alternative microQ networks 500 (FIG. 7) and 550 (FIG. 8) are illustratively shown.

Both networks 500 and 550 may be employed with embodiments of the present invention.

In FIG. 7, a node 501 exists for each component in C and a node exists 502 for each PN. There is an arc from the c node 501 to the n node 502 if and only if there is a p in $S_c$ with $A_{pn}=1$. The capacity of arcs 504 is infinite (in other words, a very large number) and the weight (cost) is 0.

There is a sink node t 503 to which all PNs are connected. The arc from processing node n to t has capacity $H_n$ and weight 0.

In addition, there is a source node s 506 that is connected to component node c 501 with $\rho_c$ arcs 508. Each arc 508 represents one of the linear segments. The capacity of segment r is $\alpha_{rc}-\alpha_{(r-1)c}$. The weight of segment r is the slope of the linear function that corresponds to that segment of $I_c$.

Compute a minimum cost flow in this network with cost of arc equal to the negative weight of the arc. The "flow" through the network is in processing power. Then $\overline{g_c}$ is the sum of flow on the parallel arcs from s 506 to c 501.

Computing the Allocation: The solution approach includes an iterative procedure. At a high level, expand the network 500 described above to include nodes for PEs 553 as shown in FIG. 8.

Then, perform an iterative procedure. For each component 552, add the pacing constraints for our current estimate of $g_c$. Solve the corresponding linear program. Then, for each component 552, check if the new value of $g_c$, call it $g'_c$, lies in the same interval as the old value, with regard to pacing constraints. For each component 552, for which these two values lie in different intervals, do the following: if $g_c$ is in interval i and $g'_c$ is in interval j>i, remove the pacing constraints for c in interval i and add pacing constraints for c in interval i+1. (Act symmetrically if j<i.)

If at some iteration, for all components c 552, $g_c$ and $g'_c$ is in the same interval, the module is done, and there is a solution that obeys the pacing constraints. The present invention outputs the allocations for each PE 553. (The specifics of the computation and linear program are described below.)

The Linear Program: The linear program is preferably a network flow program with additional linear side constraints (namely, the pacing constraints). The node set: U is the disjoint union of the following node sets, as shown in FIG. 8:

$\{u_c|c \in C\}$ (552)

$\{u_p|p \in P\}$ (553)

$\{u_n|n \in N\}$ (554)

source (551) and sink (555) $\{s,t\}$.

The arc set: B is the disjoint union of the following arc sets shown in FIG. 8:

$E_c=\{(s,u_c)_r|c \in C, 1 \leq r \leq \rho_c\}$ (556)

$E_P=\{(u_c,u_p)|c \in C, p \in S_c\}$ (558)

$E_Z=\{(u_p,u_n)|p \in P, n \in Z_p\}$ (560)

$E_N=\{(u_n,t)|n \in N\}$ (562)

Arc Weights, Capacities, and Partition Constraints: Arc $(s,u_c)_r$ (556) in $E_c$ has capacity $\alpha_{rc}-\alpha_{(r-1)c}$. The weight of segment i is the slope of linear function that corresponds to the $r^{th}$ segment of $I_c$. Arcs (560) in $E_z$ have infinite capacity and 0 weight. Arc $(u_n,t)$ (562) in $E_N$ has capacity $H_n$ and weight 0. Arcs (558) in EP all have weight 0.

Instead of fixed capacities for arcs 558 in $E_P$, there is an additional linear constraint for each set of arcs 558 in $E_P$ corresponding to a single component. These are called partition constraints. The partition constraint assumes that $g_c$ falls within the range of $\overline{g_c}$ obtained by the initial estimate. This range corresponds to a particular partition of processing power to PEs as described in Step 2 above. The constraint restricts the proportion of flow leaving the component node to be the appropriate partition according to the amount of processing power allocated.

Finding a Solution: Solve the problem of finding a flow that maximizes total flow weight subject to satisfying flow conservation, capacity constraints, and partition constraints. The value $g_c$ is then the sum of flow on the parallel arcs from s 551 to c 552. The value $g_p$ is the flow on arc $(u_c,u_p)$ (558). The value $f_{pn}$ is the flow on arc $(u_p,u_n)$ (560).

Micro "Where" Model (Microw): The "where" phase may be understood by employing the following notation:

P is the number of Ps, indexed by p.

LT is the number of PNs, indexed by n.

$H_n$ is the processing power, in million instructions per second (mips) of node n.

$g_p$ is the processing power goal of PE p. This is output from the "quantity" phase of the present invention.

$\overline{B_{pn}}$ is the fractional assignment of PE to node n from the previous micro epoch.

$x_{pn}$ is 1 if the fractional allocation of PE p on node n cannot be changed during the current micro epoch.

$d_{pn}$ is the number of distinct ranges of allowable fractional assignments for PE p on node n. This will be indexed by r.

The actual $r^{th}$ range of allowable fractional assignments for PE p on node n starts at $o_{pn0r}$ and ends at $o_{pn1r}$. It is assumed that these ranges are in increasing order and all between 0 and 1. (1 represents 100% of the PN.)

$t_n$ is 1 if processing node n will be "touched", 0 otherwise. By touched it is meant that some fractional allocation has changed from the previous micro epoch.

T is the maximum number of PNs that can accept fractional allocation modifications during the current epoch.

M is the maximum amount of fractional allocation changes across all PEs and all PNs during the current epoch.

$M_p$ is the maximum amount of fractional allocation changes for PE p across all PNs during the current epoch.

$B_{pn}$ is the fractional assignment of PE p to node n at the end of the current micro epoch. This is the output of the "where" phase of the present invention.

$D_p$ is the achieved processing power of PE p at the end of the current micro epoch. This is computed as the summation of the terms $B_{pn}*H_n$ across all PNs.

With this notation the "where" phase can be described as minimizing the expression $$\sum_p \left| \sum_n B_{pn} * H_n - g_p \right|,$$

which is equal to the expression $$\sum_p |D_p - g_p|,$$

subject to the following constraints:

$$B_{pn} = 0 \text{ if } A_{pn} = 0. \quad (1)$$

-continued $$o_{pn0r} \leq B_{pn} \leq o_{pn1r} \text{ for some } r < d_{pn}. \quad (2)$$

$$B_{pn} = \overline{B_{pn}} \text{ if } x_{pn} = 1. \quad (3)$$

$$(1 - t_n)(B_{pn} - \overline{B_{pn}}) = 0 \text{ for all PEs } p \text{ and nodes } n. \quad (4)$$

$$\sum_n t_n \leq T. \quad (5)$$

$$\sum_n |(B_{pn} - \overline{B_{pn}}) * H_n| \leq M_p \text{ for each PE } p. \quad (6)$$

$$\sum_p \sum_n |(B_{pn} - \overline{B_{pn}}) * H_n| \leq M. \quad (7)$$

Constraint (1) insures that PEs are only assigned to candidate PNs. Constraint (2) insures that the fractional allocation of a PE on a PN is within the acceptable ranges. Constraint (3) allows for fixed PE and PN pairs. Constraint (4) defines the indicator variable $t_n$ for each node n. Constraint (5) bounds the number of modified PNs. Constraint (6) bounds the fractional allocation changes for each PE. Constraint (7) bounds the cumulative fractional allocation changes.

The microW method may be understood by considering the difference between the goal and the achieved allocations for each PE at any given time during the execution of the microQ phase. If this value is positive the PE is under-allocated. If it is 0 the PE is properly allocated. If it is negative the PE is over-allocated. The present invention will order the PEs from most under-allocated to most over-allocated, and revise and maintain this ordering throughout the microW phase. Sorting schemes are known to those skilled in the art.

Figure 9:
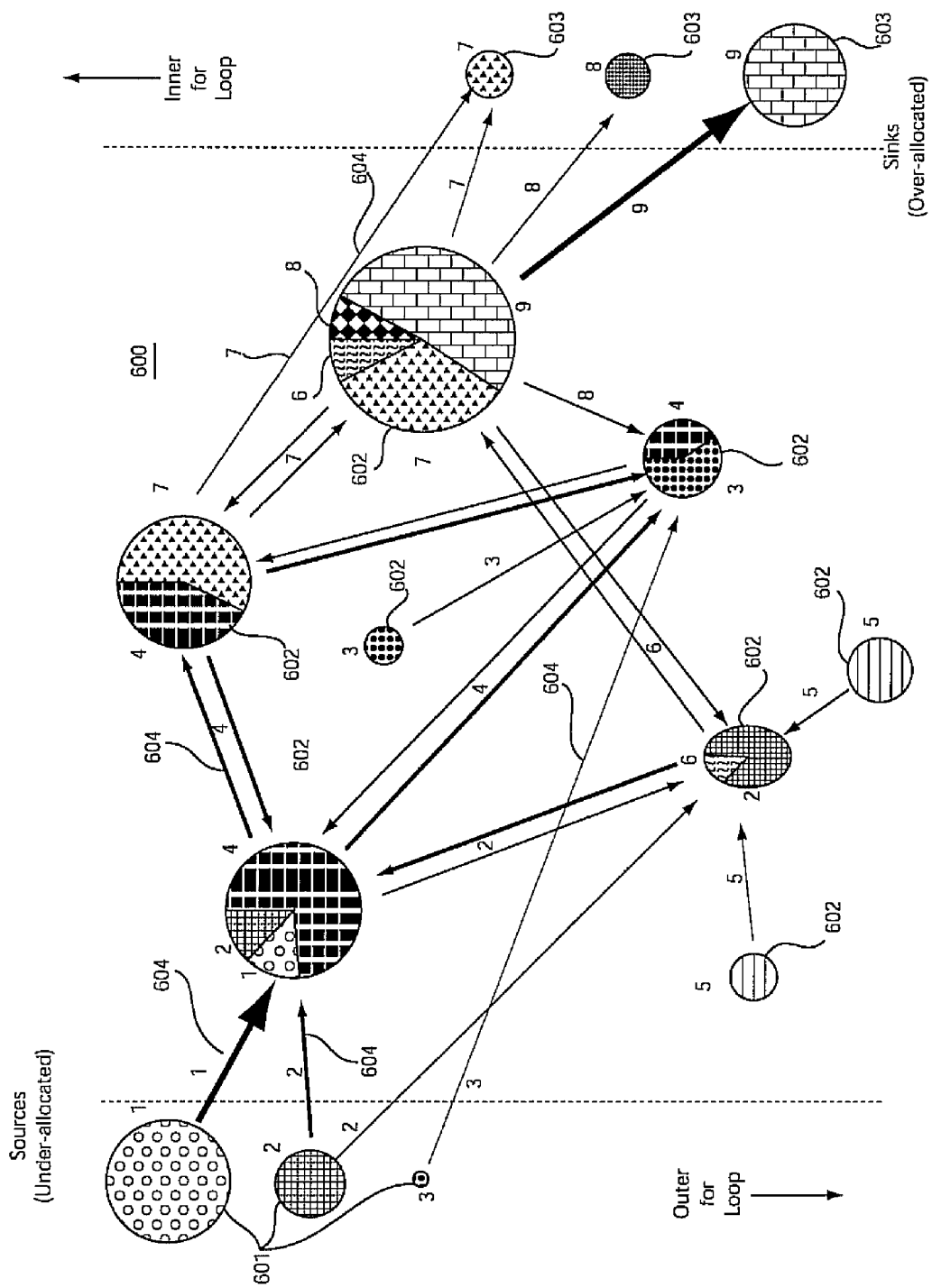
FIG. 9 is a directed graph representing processing elements that are currently assigned to processing nodes, and their current respective fractional allocations of processing power for the microQ module for one embodiment of the present invention.

Referring to FIG. 9, a directed graph 600 is maintained at each time during the execution of the microQ phase. FIG. 9 assigns each PE a unique "index" (indicated by a number from 1-9 in this illustration which could also be, for example, indicated with a texture or color to indicate allocations between nodes 601). Nodes 601 represent under-allocated PEs, in order of most under-allocated (top) to least under-allocated (bottom). The area (size) of the node 601 represents the amount of under-allocation. Nodes 602 in the center represent PNs in the computer system. The area of the node 602 represents the processing power $H_n$ of node n. The indexes (numbers 1-9) in these nodes represent the PEs that are currently assigned to the PNs, and their current respective fractional allocations $B_{pn}$ on that node.

Nodes 603 represent the over-allocated PEs, in order of least over-allocated to most over-allocated (bottom). The area of the node 603 represents the amount of over-allocation.

Now consider directed arcs 604. The arcs 604 all include indexes corresponding to the node indexes (1-9). An (indexed) arc from an under-allocated PE p to a node n exists provided:

(1) $A_p=1$; that is, the node is a candidate node for the pe.
(2) $B_{pn}<1$; that is, there is some fractional allocation increase that is possible for the PE on that node.
(3) $x_{pn}=0$; that is, the fractional allocation of the PE on the node is not fixed.

The width of this directed arc is $(1-B_{pn})*H_n$. This is the amount of additional fractional allocation that is possible. An indexed arc from node $n_1$ to $n_2$ for a particular PE p exists provided (1) $A_{pn1}=A_{pn1}=1$; that is, both nodes $n_1$ and $n_2$ are candidate nodes for the PE p.
(2) $B_{pn1}>0$; that is, there is some fractional allocation for PE p that can be moved from node $n_1$.
(3) $B_{pn1}<1$; that is, there is some fractional allocation for PE p that can be moved to node $n_2$.
(4) $x_{pn1}=x_{xpn2}=0$; that is, the fractional allocations of PE p on nodes $n_1$ and $n_2$ are not fixed.

The width of this directed arc is the minimum min $(B_{pn1}*H_n,(1-B_{pn2})*H_n)$. This is the maximum amount of PE fractional allocation that can be moved from node $n_1$ to $n_2$. Note that there may be many PEs with directed arcs between nodes $n_1$ and $n_2$, and that there may be directed arcs in both directions for a single PE. An indexed arc from a node n to an over-allocated PE p exists provided (1) $A_{pn}=1$; that is, the node n is a candidate node for PE p.
(2) $B_{pn2}>0$; that is, there is some fractional allocation decrease that is possible for PE p on that node n.
(3) $x_{pn}=0$; that is, the fractional allocation of PE p on node n is not fixed.

The width of this directed arc is $B_{pn}*H_n$. This is the amount of fractional allocation reduction that is possible.

Figure 10:
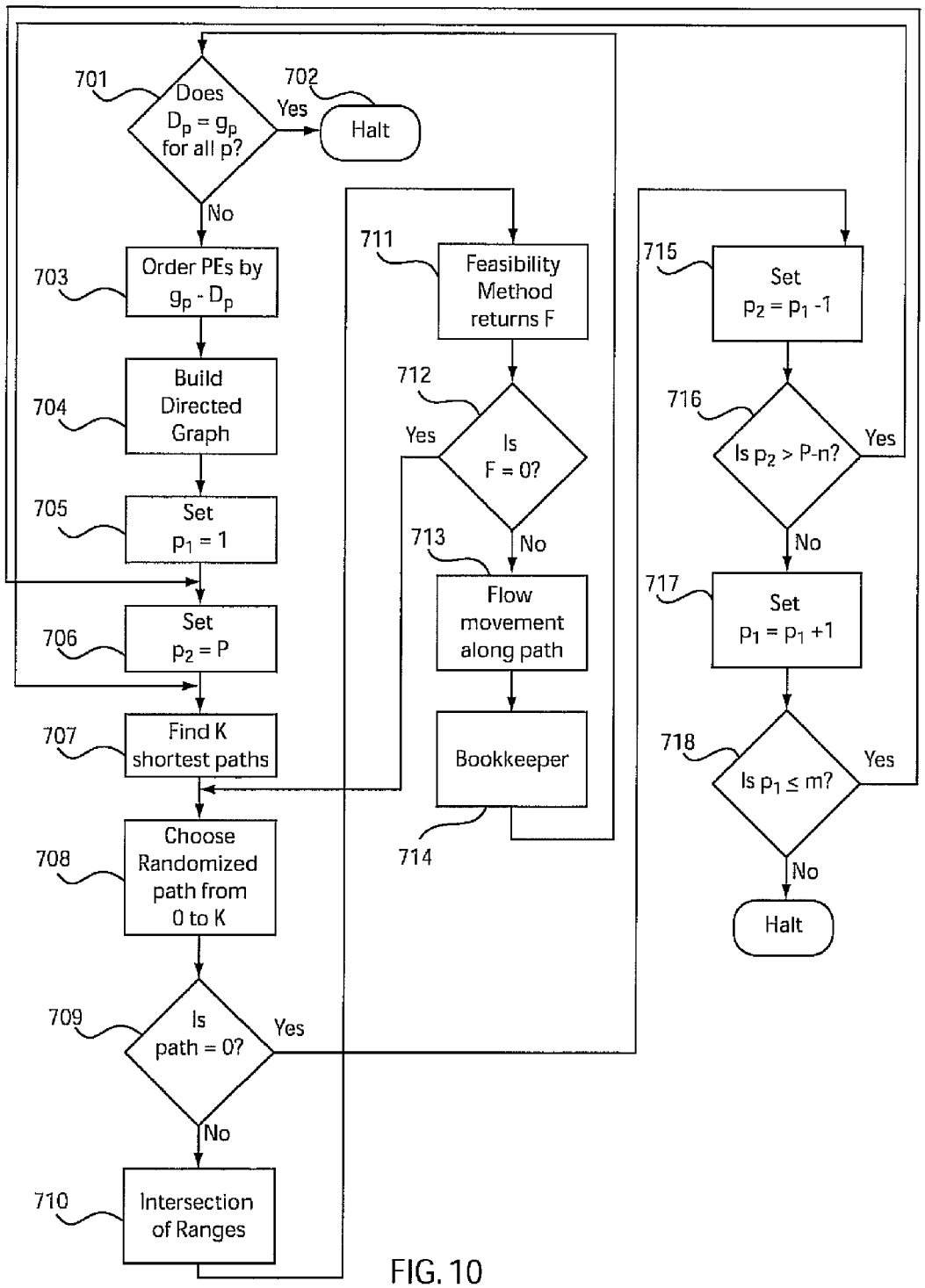
FIG. 10 is a flowchart describing a method for a microW module in accordance with one embodiment of the present invention.

Referring to FIG. 10, a flow chart describing a main method in the microW phase is illustratively shown. In block 701, the method asks whether or not $D_p=g_p$ for all PEs p. Those skilled in the art will recognize that this involves a sequence of up to P tests, one for each PE, and that this is a test for perfect balance. If the test passes, the method halts in block 702. If not, the method proceeds to block 703, which orders and reindexes the PEs from most under-allocated PE to most over-allocated PE. At the end of this test, the first m PEs will be under-allocated, the last n PEs will be over-allocated, and the remaining P's (m−n) will be perfectly allocated.

The method proceeds to block 704, which builds the directed graph described in FIG. 9. In block 705, $p_1$ (PE 1) is initialized to 1. In block 706 $p_2$ (PE 2) is initialized to P. Block 707 computes X shortest paths in the directed graph from PE $p_1$ to $p_2$, assuming that all distances in the directed graph are 1. Here $p_1$ and $p_2$ are variable names indicating the ends of a directed arc. Multiple shortest path schemes are known to those skilled in the art.

K can be chosen so that all paths whose distances are equal to the shortest path are included, and all paths of greater distance are not included. In block 708, a random but unexamined path is chosen. Assume that the kth random path between 1 and K is chosen, if that path has not already been examined, or the "path" 0 is chosen if all K shortest paths have been examined already.

In block 709, the method tests to see whether the output (path) of the randomizer is 0. Defer for the moment the case where it is. If it is not, the method proceeds to block 710, where an intersection method is called. Those skilled in the art will recognize that this is an iterative intersection scheme. Assume that the scheme returns a set of ranges common to the intersection of all possible moves of flow along the path, based on the values on the path of $d_{pn}$, the various values of $o_{pn0r}$ and $o_{pn1r}$ for each range r.

Block 711 calls a feasibility method. A flow chart for this method will be described below, but for now assume that the method returns the largest feasible amount of flow F that can be moved along the shortest path from PE $p_1$ to $p_2$. In block 712, this value F is tested. If it is 0, the method returns to block 708. If it is not, block 713 moves flow along the path from PE $p_1$ to PE $p_2$. The PEs $p_1$ and $p_2$ become better allocated by this amount, and all internal PEs within the path remain allocated precisely as before. This bookkeeping, including adjustments to $D_p$, is done in block 714. Then, the method returns to block 701.

Resuming now the case where block 709 yields a randomizer output of 0, block 715 decrements PE $p_2$ by 1. Then, block 716 tests to see if $p_2$ is greater than P−n. If it is, the method returns to block 707. If it is not, the method proceeds to block 717, where PE $p_1$ is incremented by 1. Then, block 718 tests to see if PE $p_1$ is less than or equal to m. If it is, the method returns to block 706. If it is not, the method halts at block 719.

Figure 11:
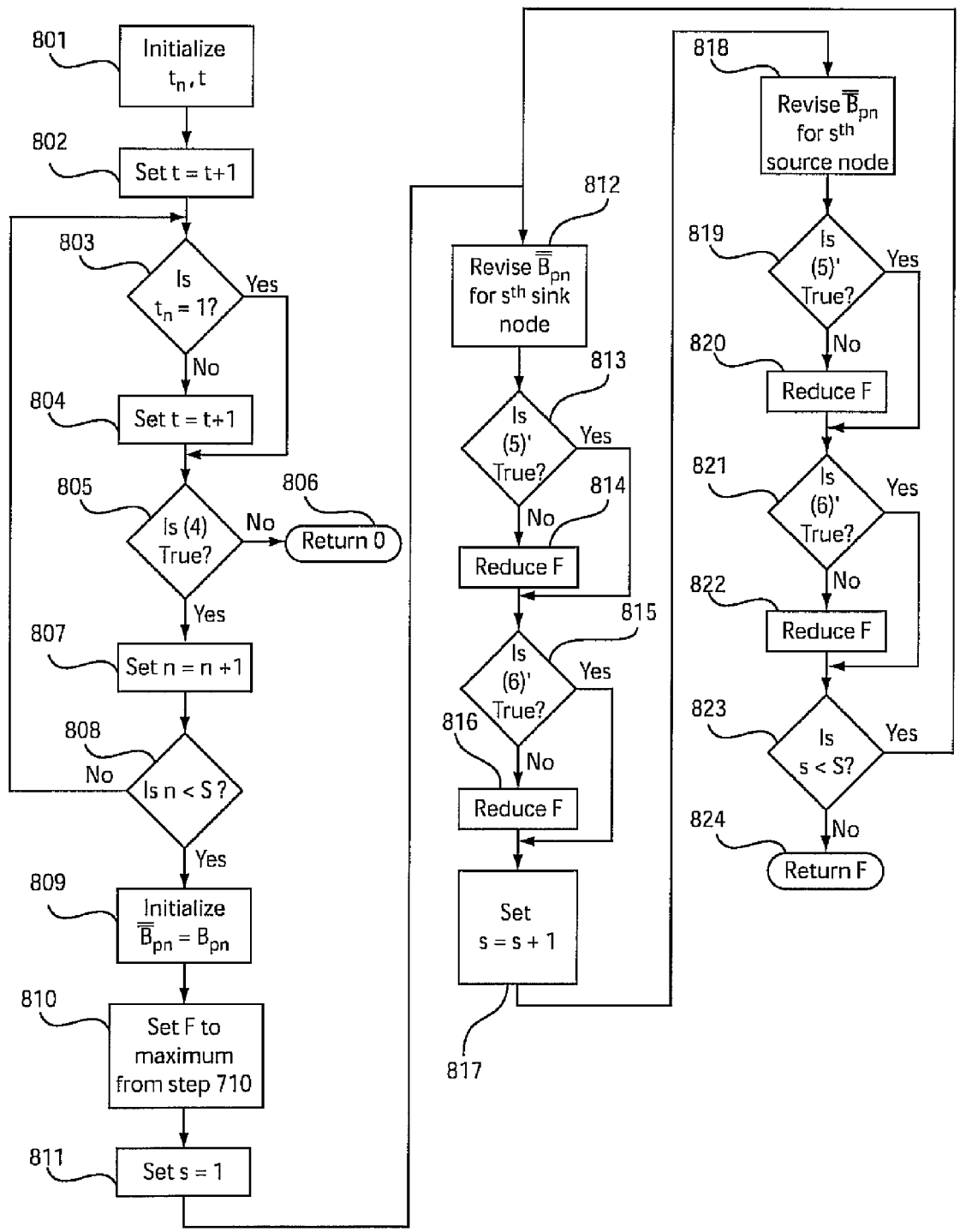
FIG. 11 is a flowchart describing a subsidiary feasibility method for the method of FIG. 10 for one embodiment of the present invention.

Referring to FIG. 11, a flow chart describing the feasibility method noted above for block 711 is illustratively shown. Those skilled in the art will recognize that constraints (1) and (3) are satisfied by the definitions of the directed arcs in the directed graph described in FIG. 9. They will also recognize that constraint (2) is satisfied because of the intersections computed in block 710 of FIG. 10.

FIG. 11 describes steps to ensure that constraints (4)-(6) are satisfied. The method tests a path of S steps (directed arcs). Note the following revised notation: The first step is from PE $p_0$ to node $n_1$. The next step is from node $n_1$ to $n_2$ via PE $p_2$. The next is from node $n_2$ to $n_3$ via PE $p_3$, and so on. The last step is from node $n_{(S-1)}$ to PE ps.

In block 801, the values of $t_n$ are initialized to 1 if there exists a PE p satisfying $B_{pn} \neq \overline{B_{pn}}$, and 0 otherwise. The number t of touched PNs is set to the sum of all the values $t_n$ over all nodes n. In block 802, node n is initialized to 1. Block 803 checks if $t_n$ is 0. The case where $t_n$ is 1 will be deferred to later. If $t_n$ is 0, t is incremented by 1 in block 804, and $t_n$ is set to 1. Then block 805 tests to see if t[T. If it is not, the method returns 0 in block 806. Otherwise, block 807 proceeds to increment n. Block 807 is also reached from block 803 if $t_n$=1. Then, block 808 tests if n is less than S. If it is, the method returns to block 803. If not the method proceeds to block 809.

Block 809 initializes $\overline{B_{pn}}$ to the current value of $B_{pn}$ for each PE p and node n. In block 810, F is set to the maximum value of the largest range of permissible values defined in the intersection step from block 710 of FIG. 10.

In block 811, s is initialized to 1. Block 812 revises the value of $\overline{B_{pn}}$ for the sink node of the $s^{th}$ directed arcs. Block 813 tests to see if $$\sum_n |(\overline{B_{pn}} - \overline{B_{pn}}) * H_n| \le M_{p_s}.$$

This will be referred to as test (5)' for ease of reference. If the sum is not less that or equal to $M_p$, block 814 reduces F by the excess, and then is reduced further by taking the minimum of F and the set of ranges from the intersection step 710 from FIG. 10. The appropriate bookkeeping is done on all prior values of $\overline{B_{pn}}$. Then, the method proceeds with block 815. This step is also reached from block 813 if that test ((5)') succeeds. Block 815 tests to see if $$\sum_p \sum_n |(\overline{B_{pn}} - \overline{B_{pn}}) * H_n| \le M.$$

This may be referred to as test (6)' for ease of reference. If the sum is not less than or equal to M, block 816 reduces F by the excess, and then is reduced further by taking the minimum of F and the set of ranges from the intersection step 710 from FIG. 10.

The appropriate bookkeeping is done on all prior values of $\overline{B_{pn}}$. Then, the method proceeds with block 817. This block is also reached from block 815 if that test ((6')) succeeds. Block 817 increments s by 1. Block 818 revises the value of $\overline{B_{pn}}$ for the source node of the $s^{th}$ directed arc.) Block 819 tests to see if $$\sum_n |(\overline{B_{pn}} - \overline{B_{pn}}) * H_n| \le M_{p_s}.$$

This is test (5)'. If the sum is not, block 820 reduces F by the excess, and then is reduced further by taking the minimum of F and the set of ranges from the intersection step 710 from FIG. 10. The appropriate bookkeeping is done on all prior values of $\overline{B_{pn}}$.

Then, the method proceeds with block 821. Block 821 is also reached from block 819 if that test (5)' succeeds. Block 821 tests to see if the sum over all PEs and all PNs of $$\sum_p \sum_n |(\overline{B_{pn}} - \overline{B_{pn}}) * H_n| \le M,$$

(test (6)'). If it is not, block 822 reduces F by the excess, and then is reduced further by taking the minimum of F and the set of ranges from the intersection step 710 from FIG. 10. The appropriate bookkeeping is done on all prior values of $\overline{B_{pn}}$. Then, the method proceeds with block 823. Block 823 is also reached from block 821 if that test (6)' succeeds.

Block 823 tests to see if s is less than S. If s is less, the method returns to block 812. If not, the method returns F in block 824.

Those skilled in the art will notice that the microW method described herein can be repeated iteratively, giving potentially different output because of the random choices made. Thus the method is compatible with an iterative approach.

Figure 12:
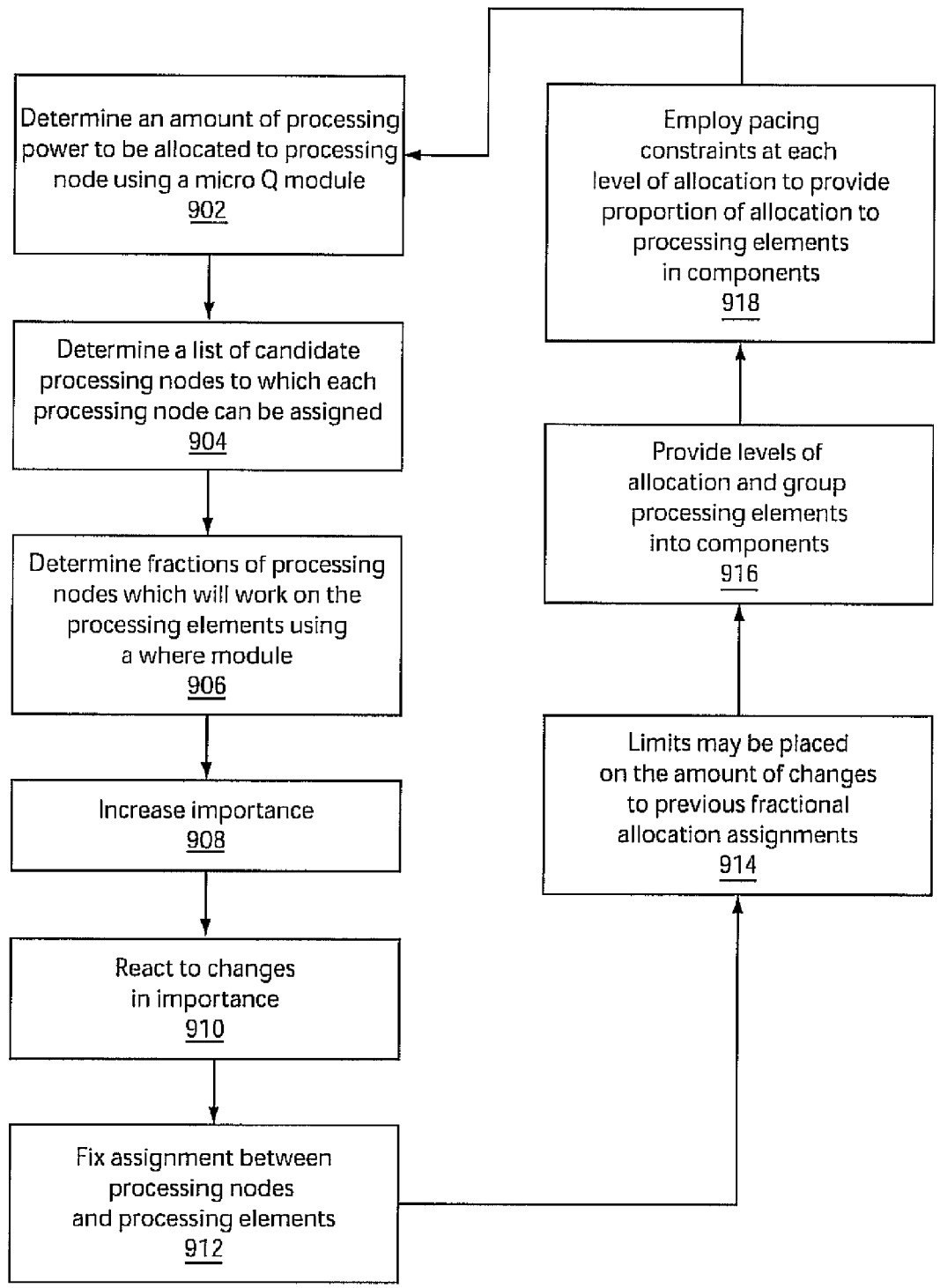
FIG. 12 is a block/flow diagram for a system/method for fractionally allocating resources to improve overall importance in a work scheduling environment.

Referring to FIG. 12, a system/method for making fractional assignments of processing elements to processing nodes for stream-based applications in a distributed computer system is illustratively shown in accordance with one embodiment. In block 902, an amount of processing power is determined to give to each processing element (pe) by providing a quantity method to determine processing goals for each processing element for a next epoch. In block 904, a list of candidate processing nodes is determined to which each processing element can be assigned. Based on a list of acceptable processing nodes, fractions of which processing nodes which will work on each processing element are determined by providing a where method configured to minimize differences between goals output by the quantity method and achieved allocations of resources in block 906.

In block 908, these steps are repeated to update allocations of the amount of processing power and the fractions to increase overall importance of work in a system.

In block 910, the system reacts to changes in importance of the work by reallocating the amount of processing power and the fractions. In block 912, limits on an amount of changes permitted to previous fractional assignments may be provided. In block 914, assignments of certain processing elements to certain processing nodes may be fixed so as not to change or change by a limited amount.

In block 916, the processing elements may be grouped into components, and the processing power may be allocated to a component using levels of processing power allocation. In block 918, pacing constraints may be employed that specify, for each level of allocation of processing power, to the component a proportion of the processing power to be allocated to each processing element.

Having described preferred embodiments of a method and apparatus for assigning fractional processing nodes to work in a stream-oriented computer system (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method of making fractional assignments of processing elements to processing nodes for stream-based applications in a distributed computer system, comprising:
    determining an amount of processing power to give to each processing element; and
    determining with a scheduling processor, based on a list of acceptable processing nodes, fractions of which processing nodes which will work on each processing element; and
    updating allocations of the amount of processing power and the fractions.

2. The method as recited in claim 1, further comprising reacting to changes in importance of the work by reallocating the amount of processing power and the fractions.

3. The method as recited in claim 1, further comprising providing limits on an amount of changes permitted to previous fractional assignments.

4. The method as recited in claim 1, further comprising fixing assignments of certain processing elements to certain processing nodes.

5. The method as recited in claim 1, wherein determining an amount of processing power includes providing a quantity method to determine processing goals for each processing element for a next epoch.

6. The method as recited in claim 5, wherein determining an amount of processing power includes determining a set of candidate processing nodes to which each processing element can be assigned.

7. The method as recited in claim 6, further comprising grouping the processing elements into components, and allocating the processing power to a component using levels of processing power allocation.

8. The method as recited in claim 7, further comprising employing pacing constraints that specify, for each level of allocation of processing power to the component, a proportion of the processing power to be allocated to each processing element.

9. The method as recited in claim 1, wherein repeating is performed to increase overall importance of work in a system.

10. The method as recited in claim 5, wherein determining fractions of which processing nodes which will work on each processing element includes providing a where method configured to minimize differences between goals output by the quantity method and achieved allocations of resources.

11. A computer program product comprising a non-transitory computer useable storage medium including a computer readable program, wherein the computer readable program when executed on a computer causes the computer to execute the steps of claim 1.

12. A method of making fractional assignments of processing elements to processing nodes for stream-based applications in a distributed computer system, comprising:
    determining an amount of processing power to give to each processing element by providing a quantity method to determine processing goals for each processing element for a next epoch;
    determining a list of candidate processing nodes to which each processing element can be assigned;
    determining with a scheduling processor, based on a list of acceptable processing nodes, fractions of which processing nodes which will work on each processing element by providing a where method configured to minimize differences between goals output by the quantity method and achieved allocations of resources; and
    updating allocations of the amount of processing power and the fractions to increase overall importance of work in a system.

13. The method as recited in claim 12, further comprising reacting to changes in importance of the work by reallocating the amount of processing power and the fractions.

14. The method as recited in claim 12, further comprising providing limits on an amount of changes permitted to previous fractional assignments.

15. The method as recited in claim 12, further comprising fixing assignments of certain processing elements to certain processing nodes.

16. The method as recited in claim 12, further comprising grouping the processing elements into components, and allocating the processing power to a component using levels of processing power allocation.

17. The method as recited in claim 16, further comprising employing pacing constraints that specify, for each level of allocation of processing power to the component, a proportion of the processing power to be allocated to each processing element.

18. A non-transitory computer program product comprising a computer useable storage medium including a computer readable program, wherein the computer readable program when executed on a computer causes the computer to execute the steps of claim 12.

* * * * *